United States Patent
Schneider et al.

[11] Patent Number: 6,151,888
[45] Date of Patent: *Nov. 28, 2000

[54] METHOD OF DIAGNOSING A CATALYTIC CONVERTER

[75] Inventors: Erich Schneider, Kircheim; Andreas Blumenstook, Ludwigsburg, both of Germany

[73] Assignee: Robert Bosch GmbH, Stuttgart, Germany

[*] Notice: This patent is subject to a terminal disclaimer.

[21] Appl. No.: 09/197,496

[22] Filed: Nov. 23, 1998

Related U.S. Application Data

[63] Continuation-in-part of application No. 08/873,292, Jun. 11, 1997, Pat. No. 5,987,883.

[30] Foreign Application Priority Data

Jun. 12, 1996 [DE] Germany .......................... 196 23 335
Nov. 22, 1997 [DE] Germany .......................... 197 51 895

[51] Int. Cl.[7] ....................................................... F01N 3/00
[52] U.S. Cl. ................... 60/274; 60/277; 60/276
[58] Field of Search ............................ 60/277, 274, 285, 60/276; 73/118.1; 123/674

[56] References Cited

U.S. PATENT DOCUMENTS

| | | | |
|---|---|---|---|
| 4,622,809 | 11/1986 | Abthoff et al. | . |
| 5,404,718 | 4/1995 | Orzel et al. | 60/274 |
| 5,602,737 | 2/1997 | Sindano et al. | 364/431.61 |
| 5,678,402 | 10/1997 | Kitagawa et al. | 60/276 |
| 5,732,551 | 3/1998 | Naber et al. | 60/274 |
| 5,842,339 | 12/1998 | Bush et al. | 60/274 |
| 5,937,638 | 8/1999 | Akazaki et al. | 60/274 |
| 5,987,883 | 11/1999 | Schneider et al. | 60/274 |

FOREIGN PATENT DOCUMENTS

| | | |
|---|---|---|
| 0492165 | 7/1992 | European Pat. Off. . |
| 0589169 | 3/1994 | European Pat. Off. . |
| 3830515 | 3/1990 | Germany . |
| 4441432 | 5/1996 | Germany . |
| WO 93/03358 | 2/1993 | WIPO . |

*Primary Examiner*—Thomas Denion
*Assistant Examiner*—Binh Tran
*Attorney, Agent, or Firm*—Walter Ottesen

[57] ABSTRACT

The invention is directed to a method for evaluating the operability of a catalytic converter mounted in the exhaust-gas system of an internal combustion engine. In the method, the actual value of a signal of an exhaust-gas probe mounted downstream of the catalytic converter is detected and an expectation value of the signal of the exhaust-gas probe is formed from quantities measured upstream of the catalytic converter. A measure is formed for the deviation of the actual value from the expectation value and the operability of the catalytic converter is evaluated on the basis of the measure.

10 Claims, 7 Drawing Sheets

FIG. 5c
Control for New Catalytic Converter

FIG. 5d
Control for Very Deteriorated Catalytic Converter

METHOD OF DIAGNOSING A CATALYTIC CONVERTER

RELATED APPLICATION

This application is a continuation-in-part application of patent application Ser. No. 08/873,292, filed Jun. 11, 1997, (now U.S. Pat. No. 5,987,883) and entitled "Method of Diagnosing a Catalytic Converter"

FIELD OF THE INVENTION

The invention relates to a method of diagnosing a catalytic converter which is used to convert toxic substances in the exhaust gas of internal combustion engines.

BACKGROUND OF THE INVENTION

It is known that the catalytic converter effects an averaging on the oxygen content in the exhaust gas. If the exhaust gas flowing into the catalytic converter is rich in oxygen, then the catalytic converter can store the excess oxygen within certain limits and then output this excess oxygen when the exhaust gas input is deficient in oxygen. An oscillation of the oxygen content in the exhaust gas forward of the catalytic converter (as is typical for a known strategy for controlling the air/fuel ratio for an internal combustion engine) is therefore attenuated by the catalytic converter, that is, the oscillation is reduced with respect to its amplitude. If the exhaust-gas probe mounted rearward of the catalytic converter registers unwanted intense oscillations of the oxygen content, then this is evaluated as a sign for a defective catalytic converter because a loss of the capability of converting toxic substances is associated with the loss of this attenuating action.

In another known method, the actual value of the signal of an exhaust gas-probe, which is mounted downstream of the catalytic converter, is detected and an expectation value of the signal of the above-mentioned exhaust-gas probe is formed from quantities measured upstream of the catalytic converter. Furthermore, a measure for the deviation of the actual value from the expectation value is formed and the operability of the catalytic converter is judged on the basis of this deviation.

Uncertainties can occur in the evaluation of the operability of the catalytic converter in this method when using probes having a nonlinear characteristic and fluctuating control position, that is, a fluctuating mean value of the actual value of the oxygen construction in the exhaust gas.

SUMMARY OF THE INVENTION

It is an object of the invention to provide a method for avoiding the above-mentioned unwanted influences.

The method of the invention is for evaluating the operability of a catalytic converter mounted in the exhaust-gas system of an internal combustion engine. The method includes the steps of: providing an exhaust-gas probe mounted downstream of the catalytic converter and the exhaust-gas probe having an operating point; detecting the actual value of a signal of the exhaust-gas probe mounted downstream of the catalytic converter; forming a modelled value of the signal of the exhaust-gas probe from quantities measured upstream of the catalytic converter and by considering the operating point; forming an index for the deviation of the actual value from the modelled value; and, evaluating the operability of the catalytic converter on the basis of the index.

The invention is based on the considerations presented below.

In a probe having a nonlinear characteristic line, the amplitudes of the measured probe voltage for the same lambda fluctuations are different in different ranges of the probe characteristic line. For this reason, and in dependence upon the control position (that is, depending upon the position of the mean lambda value of the control oscillation), different bandwidths of the measured amplitudes of the probe signal rearward of the catalytic converter result. The actual value of the amplitudes is therefore dependent not only upon the state of deterioration of the catalytic converter but also on the control position and therefore on the operating point (lambda, probe voltage) of the probe on its characteristic line. The operating point is specified by the control position (lambda).

The subject matter of this invention is the consideration of this dependency for a method for diagnosing a catalytic converter on the basis of the signal of the rearward probe. A further object of this invention is the consideration of the above-mentioned dependency for a method to diagnose a catalytic converter as set forth in the above-mentioned patent application Ser. No. 08/873,292, filed Jun. 11, 1997.

An advantage of the invention is that an improvement of the quality of the statement as to the state of deterioration of a catalytic converter is provided. In this way, a diagnostic method exhibits tighter tolerances. Stated otherwise, the invention permits a more reliable separation of catalytic converters which are still good from those which are already deteriorated. Accordingly, the method of the invention is more reliable and fault announcements which result too early are avoided.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
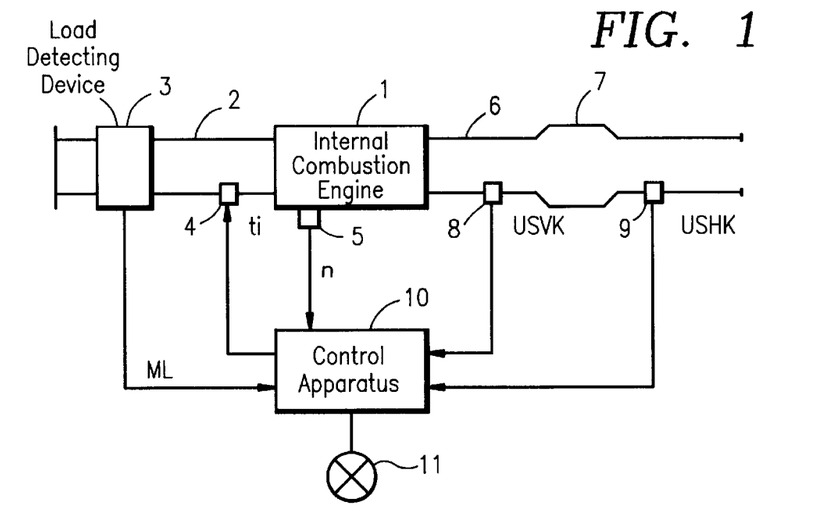
FIG. 1 is a block diagram showing the technical background within which the method of the invention is applied.

FIG. 1 shows an internal combustion engine 1 having an intake pipe 2, a load detecting device 3, a fuel-metering means 4, an rpm sensor 5, an exhaust-gas system 6, a catalytic converter 7, exhaust-gas probes 8 and 9, a control apparatus 10 and a means 11 for displaying an error.

The control apparatus 10 receives the signals ML of the load-detecting means, (n) of the rpm sensor and the signals USVK and USHK of the two exhaust-gas probes and forms therefrom, inter alia, a fuel-metering signal ti such as a fuel injection pulsewidth for driving injection valves 4 as fuel-metering means. For this purpose, a base value tl of the drive signal ti is determined for the fuel-metering means as a function of the inducted air mass ML and the rpm (n). This base value is multiplicatively corrected in a closed control loop via a control positioning variable FR which, in a manner known per se, is generated by applying a PI control strategy to the deviation of the probe signal USVK from a desired value. In the formation of the fuel metering signal, the signal USHK can be included additionally, for example, for the formation of a desired value.

In this technical background, a diagnosis of a catalytic converter takes place on the basis of the signal of the rearward probe. According to the invention, the operating point (control position) of the rearward probe is considered. This operating point can be determined by lowpass filtering the probe signal. The control position can be considered when modeling a probe signal by forming a corrective quantity. This corrective quantity reduces the difference between the measured and modeled probe signals. Furthermore, the corrective quantity can be formed in dependence upon the measured probe amplitude.

Figure 2:
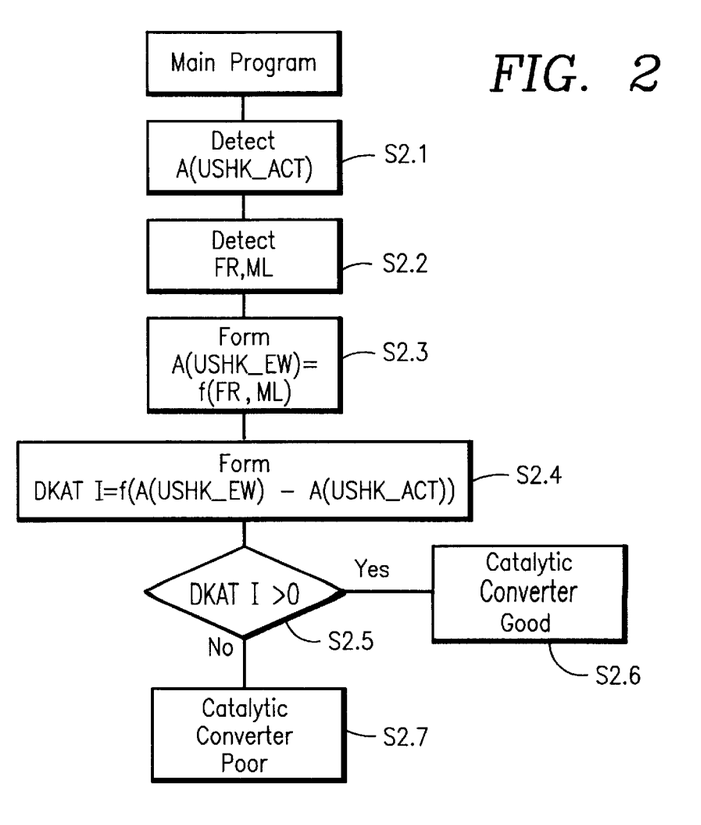
FIG. 2 shows an embodiment of the method of the invention in the context of a flowchart.

In the technical background shown in FIG. 1, the embodiment of the method of the invention shown in FIG. 2 can be carried out. A step S2.1 is accessed from a higher-ranking engine control or main program. In step S2.1, the actual value A(USHK-ACT) of the signal amplitude of the exhaust-gas probe mounted downstream of the catalytic converter is detected. Step S2.2 serves to detect quantities which influence the oxygen entry into the catalytic converter. These quantities can be measured upstream of the catalytic converter. For example, those quantities are the inducted air mass ML and the control positioning variable FR.

From the quantities detected in step S2.2, a modelled value or expectation value A(USHK-EW) is computed for the signal amplitude of the exhaust-gas probe mounted downstream of the catalytic converter. The basis for the formation of the expectation value or modelled value is the (hypothetical) influence of a catalytic converter which can be evaluated as being just still good. Thereafter, in step S2.4, the formation of the catalytic converter evaluation quantity DKAT I takes place as a function of the difference of the expectation value A(USHK-EW) and the actual value A(USHK-ACT.) If the catalytic converter is still better than the model catalytic converter which is just still good and which forms the basis of the formation of the expectation value, then the actual values are less than the expectation values. Under the precondition that the DKAT I formation has the sign of the difference A(USHK-EW)–A(USHK-ACT), the catalytic converter is evaluated in step S2.6 as good when DKAT I in step S2.5 is positive. If, in contrast, DKAT I is negative, then the catalytic converter is evaluated in step S2.7 as being poor and, if required, the means 11 from FIG. 1 is activated which shows this state. Stated otherwise, the catalytic converter is evaluated with a method wherein the actual value of the signal of an exhaust-gas probe, which is mounted downstream of the catalytic converter, is detected and wherein an expectation value of the signal of the above-mentioned exhaust-gas probe is formed from the quantities measured upstream of the catalytic converter. A measure or index for the deviation of the actual value from the expectation value is formed and the operability of the catalytic converter is evaluated on the basis of this measure.

The catalytic converter is then advantageously evaluated as being non-operational when the measure for the deviation after a pregiven time span exceeds a pregiven threshold value.

Quantities measured upstream of the catalytic converter are used and are advantageously a quantity, which is based on the signal of an exhaust-gas probe mounted forward of the catalytic converter, and a signal, which indicates the mixture quantity inducted by the internal combustion engine.

Values of the difference of the actual and expectation values can be summed (integrated) as a measure for the deviation of the actual value from the expectation value. These values can follow each other sequentially in time.

Figure 3:
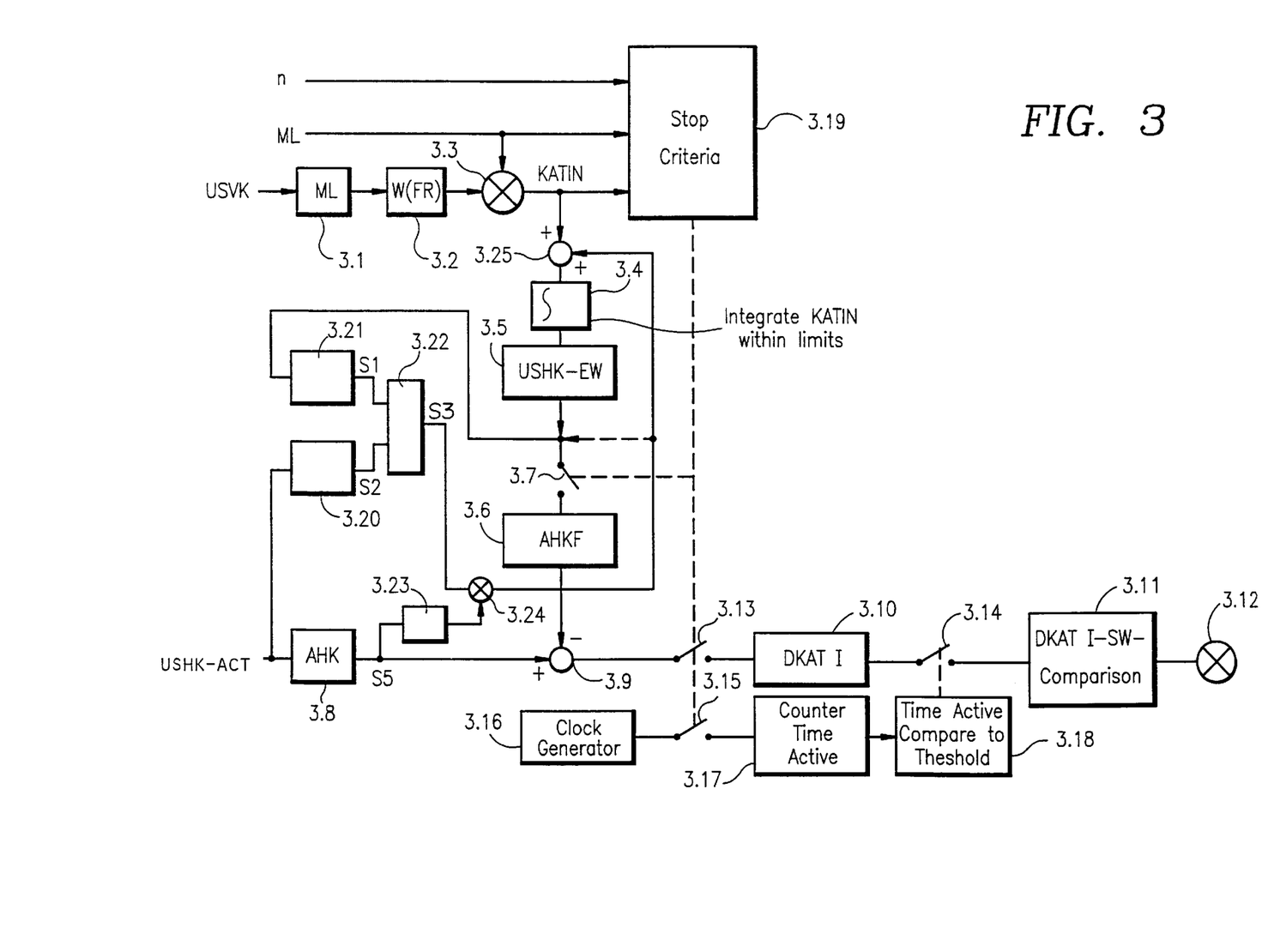
FIG. 3 shows an embodiment of the method of the invention in the form of function blocks.

FIG. 3 shows a detailed embodiment of the invention in the context of a function block diagram. Here, blocks 3.20 to 3.25 relate to the subject matter of the invention, that is, the addition and the blocks 3.1 to 3.19 relate to the subject matter of the above-mentioned patent application Ser. No. 08/873,292.

Figure 4A:
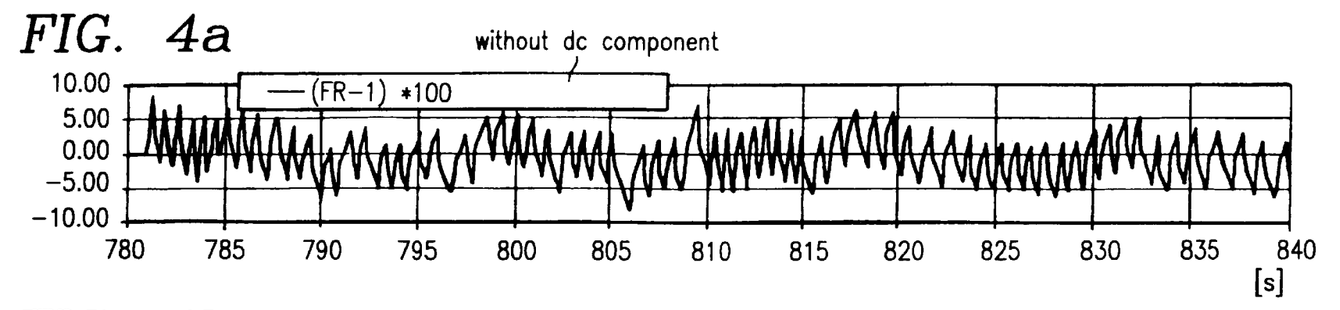
FIGS. 4a to 4g show the time-dependent traces of several signals which can be taken off the function block diagram of FIG. 3 at various locations; and, FIGS. 5a to 5d show the influence which the nonlinearity of the characteristic line in combination with a changing control position exercises on the bandwidth of the probe voltage fluctuation to be measured.
Figure 4B:
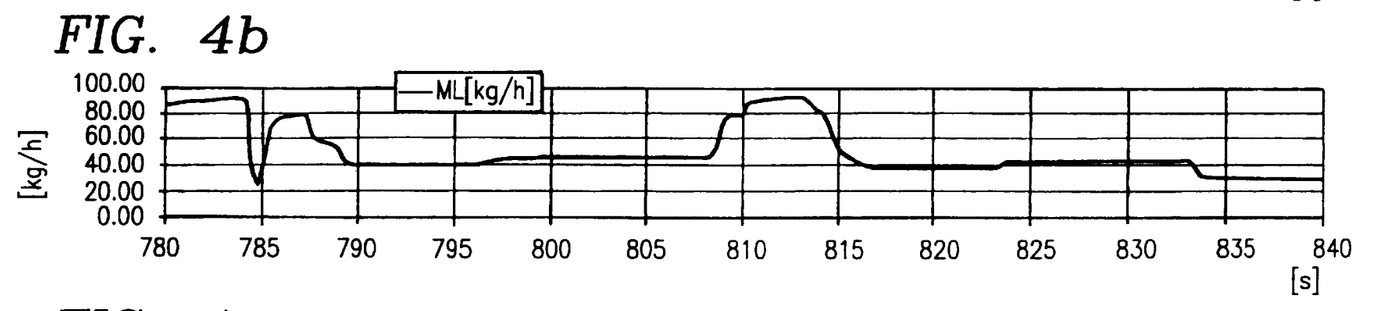
Figure 4C:
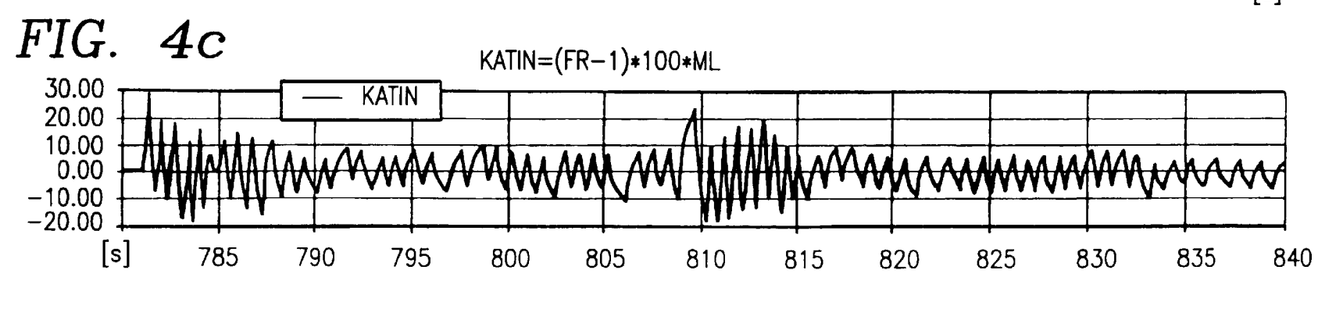

In block 3.1, the already-mentioned control position variable FR is formed from the signal USVK of the forward probe. Block 3.2 serves for filtering out the alternating-current component W of the control positioning variable FR. This can take place, for example, by forming the difference of the instantaneous and mean values of the control positioning variable FR. The alternating-current component defines a measure for the oxygen content of the exhaust gas with respect to its magnitude and sign. A typical trace is shown in FIG. 4a. The quantity KATIN is obtained by multiplication with the inducted air mass ML at the coupling point 3.3. The quantity KATIN is a measure for the positive or negative input of oxygen into the catalytic converter. A trace of ML is shown in FIG. 4b and a trace of the product KATIN is shown in FIG. 4c.

Figure 4D:
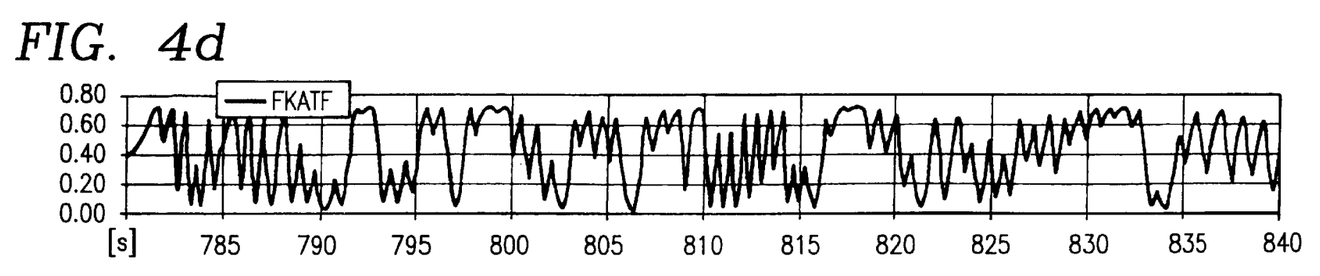

The integration of the quantity KATIN in block 3.4 supplies a measure for the actual oxygen charge level of the catalytic converter. The integration runs within limits as are typical for a catalytic converter which is still just usable. If such a catalytic converter can, for example, store a quantity X0 of oxygen and if this value is achieved during integration, then the integration result is held constant up to reversal of the direction of integration. In this time, the expectation value USHK-EW for the signal of the exhaust-gas probe, which is mounted rearward of the catalytic converter, remains at a level characteristic for oxygen-rich exhaust gas. The expectation value USHK-EW is formed in step S3.5. The foregoing is so because one must proceed from the condition that the already filled catalytic converter passes on additional oxygen. For a change of sign of FR, KATIN also changes sign and the direction of integration in block 3.4 reverses. If the catalytic converter was previously filled with oxygen, then it will now be emptied. As soon as the integration value represents an empty catalytic converter, then the expectation value USHK-EW in step S3.5 is changed to a value characteristic for oxygen-deficient exhaust gas. The expectation value for the signal USHK-EW is accordingly formed in dependence upon a modelled catalytic converter fill level on the basis of a hypothesis for the catalytic converter state and further on the basis of quantities which can be measured upstream of the catalytic converter. These quantities represent the oxygen input into the catalytic converter. The trace of an expectation value USHK-EW formed in this manner is shown for the signal of the rearward probe in FIG. 4d.

Figure 4E:
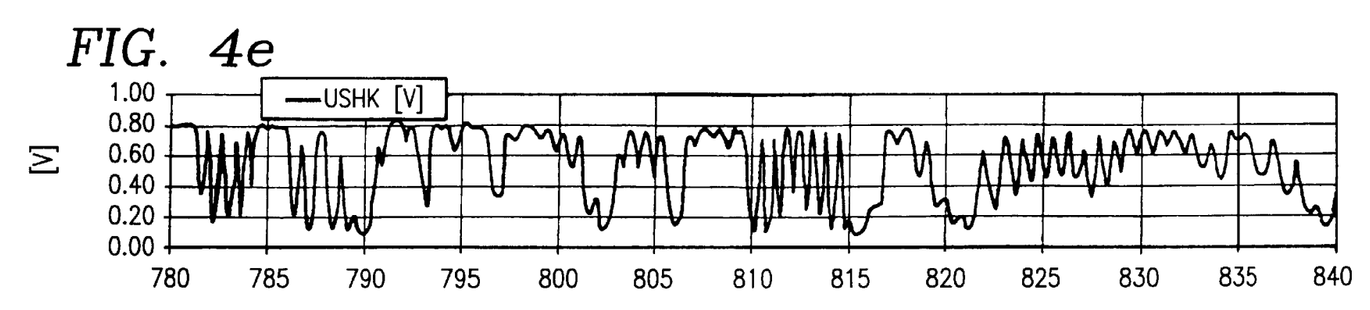

FIG. 4e shows the time-dependent trace of the signal of the probe rearward of the catalytic converter. This signal is recorded under the same conditions. A comparison of both signal traces makes clear the desired similarity of the model-formed expectation value (FIG. 4d) to the measured actual value (see FIG. 4e).

Figure 4F:
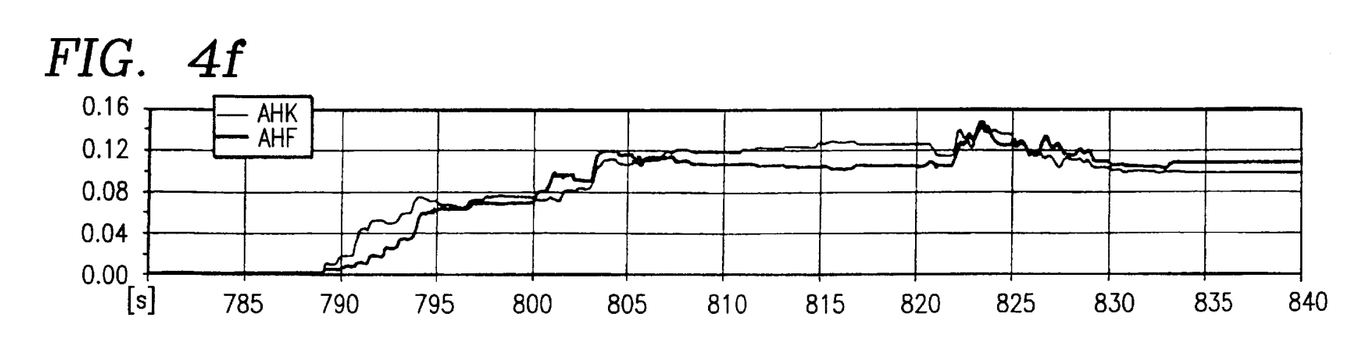

In block 3.6, the amplitude AHKF of the expectation value USHK-EW is determined. The AHKF formation can be interrupted when certain stop conditions are present. These stop conditions are explained below. The switch 3.7 symbolizes this interruption possibility. In an analog manner, the amplitude AHK of the actual value USHK-ACT is determined in block 3.8. However, no interruptions are provided. The time-dependent traces of both amplitudes are shown in FIG. 4f. The formation starts at a time point t0 and is interrupted when the above-mentioned stop conditions are present.

In block 3.9, a difference formation of the amplitude values takes place. Thereafter, this difference is integrated in block 3.10 and is compared in block 3.11 to a threshold value and closed switches 3.13 and 3.14 are assumed. The fault lamp 3.12 is switched on in dependence upon the result of the comparison.

Figure 4G:
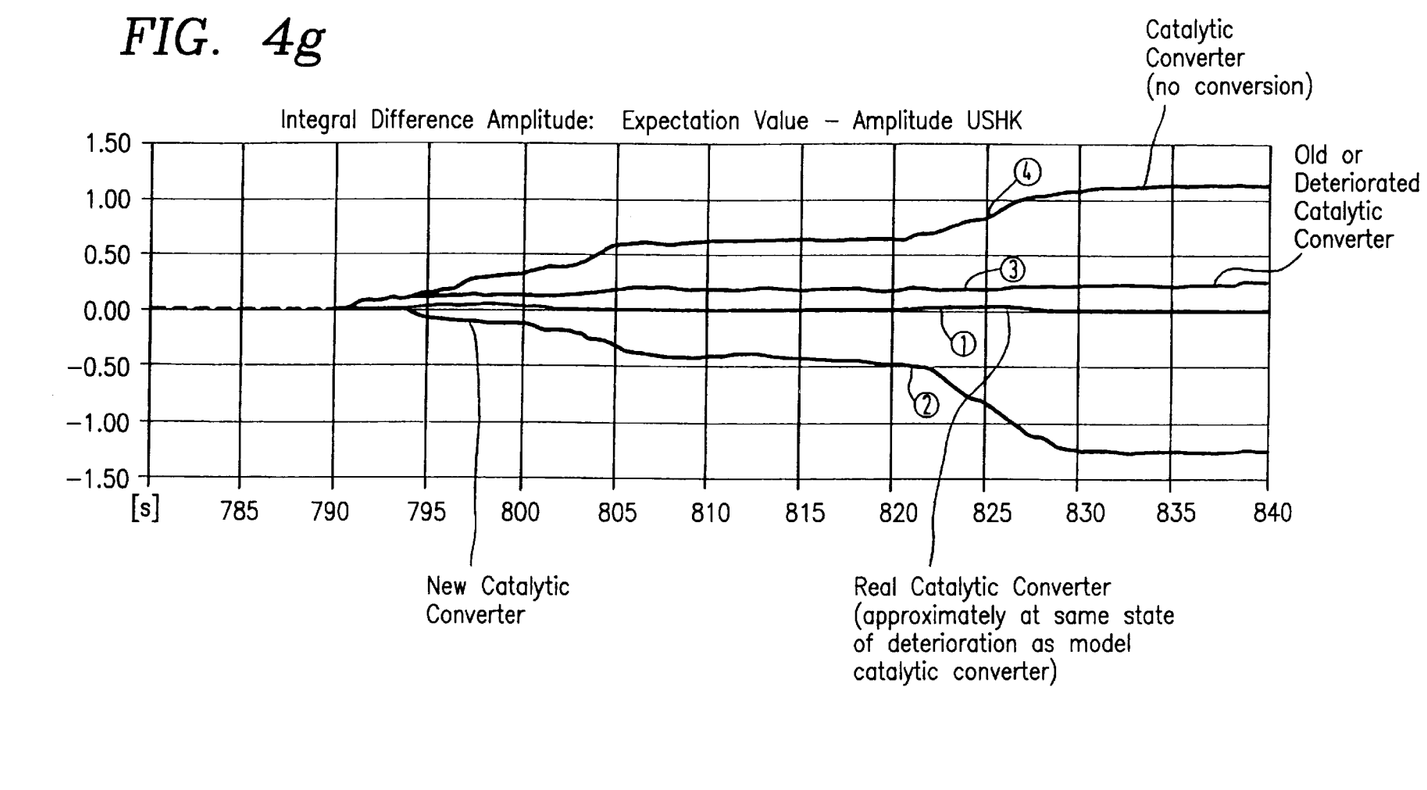

The criteria under which the fault lamp is to be switched on are explained with respect to FIG. 4g which shows the time-dependent trace of the integral of the difference of expectation value and actual value for four differently deteriorated catalytic converters.

Line 1 corresponds to a real catalytic converter which is approximately at the same state of deterioration as the model catalytic converter which is the basis of the formation of the expectation value. The difference, and therefore also the integral of the difference, is correspondingly small between the measured actual value and the model-formed expectation value (formed in accordance with a pregiven model). Line 1, which extends in the vicinity of 0, therefore points to a catalytic converter which corresponds to the model catalytic converter and therefore still just satisfies the requirements as to the toxic substance conversion.

Line 2 corresponds to a new catalytic converter which is better than the model catalytic converter. The new catalytic converter attenuates the amplitude of the oscillations in the oxygen content of the exhaust gas to a greater extent than the model catalytic converter. The measured actual values are therefore less than the expectation values so that the difference (actual value–expectation value) is less than 0 for the determination of the algebraic sign at point 3.9 of FIG. 3. Stated otherwise, the line 2 runs clearly below the 0 line and points to a catalytic converter which is still good.

Opposite relationships are present for lines 3 and 4 which point to poor catalytic converters. In both cases, the measured actual value is greater than the expectation value which is based on a catalytic converter which is just still acceptable.

From the foregoing, the catalytic converters, which are still good, are separated by a threshold from the catalytic converters which are deteriorated. The threshold runs between the poor and the good catalytic converters. The position of the threshold (for example, the value 0) is dependent upon the sign convention of the point 3.9 in FIG. 3 and of the model taken which forms the basis of the formation of the expectation value. If, for example, a new catalytic converter forms the basis of the formation of the expectation value, then a trace in the proximity of zero would result only for a new catalytic converter. The degree of deterioration would in this case be measured from the spacing of the measured traces to the zero line. However, all lines would run above the zero line.

In the presentation up to now, a continuous signal path between the subtraction point 3.9 and the fault lamp 3.12 is assumed which corresponds to closed switches 3.13 and 3.14 (or switches which are not present).

To further increase the reliability and reproducibility of the diagnostic statements, the function of the switches 3.13 to 3.15 in combination with the blocks 3.16 to 3.19 is of special advantage. The function of this arrangement comprises interrupting the diagnostic function when certain stop criteria are present. One stop criterion is suppressing the diagnosis in specific operating ranges of the internal combustion engine such as at high load ML and rpm (n). This procedure is, for example, purposeful when the engine is driven in this operating range outside of the lambda=1 control. This state is noted in block 3.19 which then opens the switches 3.13 and 3.15. The opening of the switch 3.13 effects an interruption of the DKAT I formation and the opening of the switch 3.15 has the consequence of stopping a time measurement in the blocks 3.16 to 3.18. Here, the time measurement takes place with the purpose of permitting the threshold value comparison in block 3.11 by closure of switch 3.14 only after a predetermined diagnostic time span has elapsed. The diagnostic time span is not shortened by stop phases for open switches 3.13, 3.14. As a further stop criterion, the value of the quantity KATIN is used. If the quantity KATIN exceeds, for example, a pregiven maximum value, then, in some circumstances, a not completely filled catalytic converter could not completely store the oxygen input per unit of time which is associated with a high KATIN value so that also rearward of the catalytic converter, oxygen could still be measured. To suppress a case of a catalytic converter overload, which could possibly falsify the diagnostic result, the switches 3.13 and 3.15 are opened.

Stated otherwise, the integration or even summation of the difference does not take place when the catalytic converter does not operate in a compensating manner on the content of the oxygen in the exhaust gas.

This can then, for example, take place when the oxygen excess (or deficiency), which flows into the catalytic converter per unit of time, exceeds a pregiven maximum value.

The oxygen excess (or oxygen deficiency) flowing into the catalytic converter per unit of time can be formed as the product of the air quantity, which is inducted by the engine per unit of time, and the deviation of the actuating quantity of a mixture control loop from the neutral value corresponding to the stoichiometric mixture composition.

Furthermore, the integration does not take place when the oxygen fill level of the catalytic converter exceeds a pregiven maximum value or drops below a pregiven minimum value.

The pregiven maximum value should correspond to the maximum oxygen storage capacity of a catalytic converter which is just still operational.

The oxygen fill level of the catalytic converter can be formed via integration of the product of the air quantity, which is inducted per unit of time by the engine, and the deviation of the actuating variable of a mixture control loop from the neutral value corresponding to the stoichiometric mixture composition.

Figure 5A:
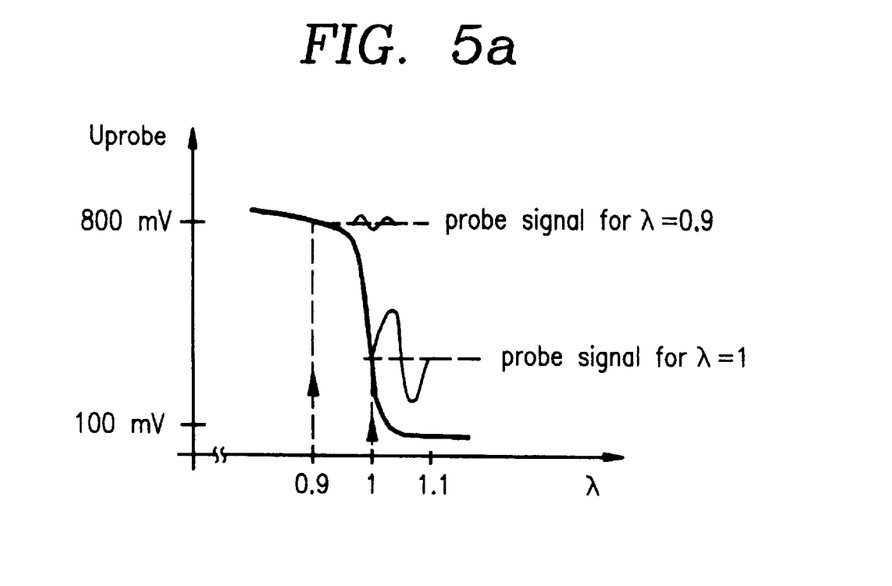
Figure 5B:
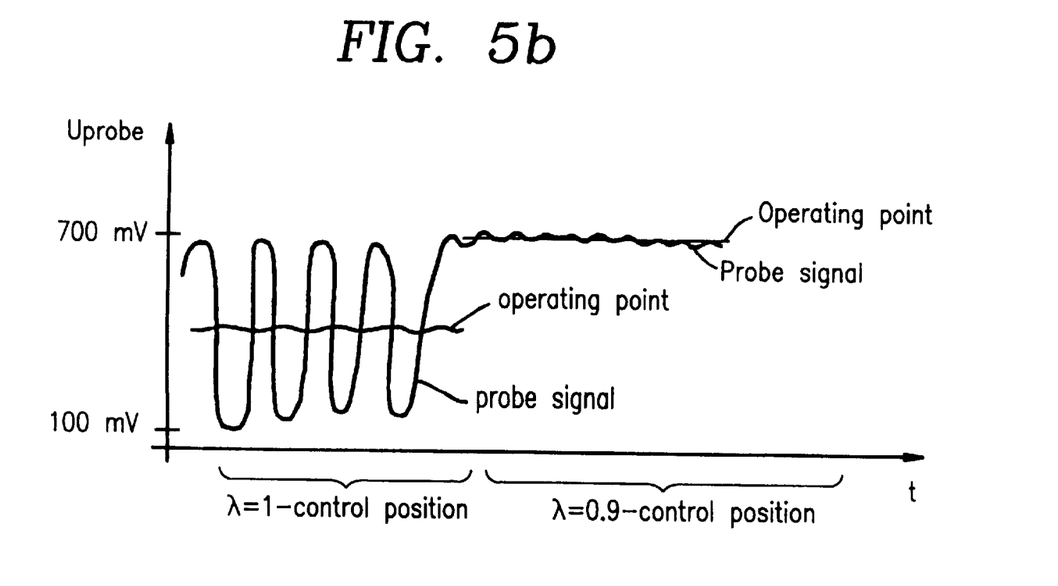

FIG. 5a shows the influence of the nonlinearity of the characteristic line of the U(lambda) probe on the amplitudes of the probe voltage to be measured. As shown in FIG. 5a, the amplitudes of the probe voltage (Uprobe) are different in different regions of the probe characteristic line for the same lambda fluctuations. In this way, and depending upon the control position (that is, depending upon the position of the mean lambda value of the control fluctuation), different bandwidths of the measured amplitudes of the signal of the probe rearward of the catalytic converter result. This can be additionally seen in FIG. 5b which shows the trace of the probe voltage (Uprobe) as a function of time for two different control positions (lambda=1, lambda=0.9).

In general, for a new catalytic converter, the operating point of the probe mounted rearward of the catalytic converter lies in the upper range; whereas, for a deteriorated catalytic converter, the probe characteristic line lies in the middle region. Stated otherwise, for a new catalytic converter, the actual control position to be measured is high and, for a deteriorated catalytic converter, the actual control position to be measured is low. In contrast, the control position of the model signal has, up to now, been independent of the deterioration of the catalytic converter.

The difference of the measured and modeled probe voltage amplitudes is a measure for the deterioration of the catalytic converter. For a new catalytic converter, the measured probe signal shows, in contrast to the model, no signal fluctuations. The difference of the signals is therefore high so that the catalytic converter is deemed to be operationally sound (line 2 in FIG. 4g).

This is, in part, attributable to the high control position which effects small amplitudes in the actual value of the signal of the rearward probe. The influence of a stable high control position is not critical here and is, indeed, advantageous because the high control position increases the signal difference for a new catalytic converter.

However, if unwanted operating point shifts occur, the amplitudes of the actual value of the signal of the rearward control probe increase. Unwanted operating point shifts can, for example, be caused by component drifts or tangent effects. The actual value of the amplitudes is therefore dependent not only on the state of deterioration of the catalytic converter but also on the control position and therefore on the operating point (lambda, probe voltage) of the probe on the characteristic line thereof. This operating point is determined by the control position (lambda).

For a completely new or a completely old catalytic converter, the above-mentioned dependency can be neglected because it does not lead to erroneous detections.

This additional dependency does constitute a disturbance especially when the actual catalytic converter approaches the state of the hypothetical borderline catalytic converter, however, since amplitude increases can be interpreted as a fault of the catalytic converter because of shifts in the operating point.

To ameliorate this condition, and according to a feature of the invention, the shifts of the operating point are considered when forming a model. For this purpose, a corrective quantity is formed in dependence upon the operating point of the probe and this corrective quantity is considered in the diagnosis of the catalytic converter.

The operating point can, for example, be determined in that the probe signal is lowpass filtered. Block 3.20 in FIG. 3 represents a lowpass filtering. In this way, the oscillating signal component, which results from the mixture fluctuations, is eliminated and the direct-current component S2 remains. The direct component S2 corresponds to the instantaneous operating point.

The modelled probe signal is likewise lowpass filtered and this is symbolized by the block 3.21 in FIG. 3. Block 3.21 supplies the signal S1 as a direct-current component of the expectation value.

The difference S3 of the results (S1, S2) of the lowpass filtering is used as a corrective quantity when modeling the probe signal. The difference formation takes place in block 3.22.

In the embodiment of FIG. 3, the corrective quantity can, for example, be additively coupled as a first alternative at the input of the block 3.4 with the signal KATIN or, as a second alternative, be additively coupled at the output of block 3.5 with the signal S1.

For a real catalytic converter (which, for example, just still satisfies the exhaust-gas standards), these measures effect an improvement of the detection reliability because the comparison of the signals of the actual value and expectation value (comparison is decisive for detection) is no longer influenced by an offset of the mean values of both signals.

The first alternative has the advantage that it is especially easy to realize. Because of the consideration of the difference already at the start of the modeling, the second alternative effects an adaptation of the expectation value which is very close to reality when the real catalytic converter behaves similar to a catalytic converter which is at the borderline of acceptability. This results in an especially good demarkation for distinguishing between catalytic converters which are still good and those which are already poor.

To reduce the problem of an erroneous evaluation, and in the context of the second alternative, an attenuation of the signal difference in advance of the influence on the formation of the expectation value is advantageous. This advantage appears for very new catalytic converters or for very deteriorated catalytic converters.

Figure 5C:
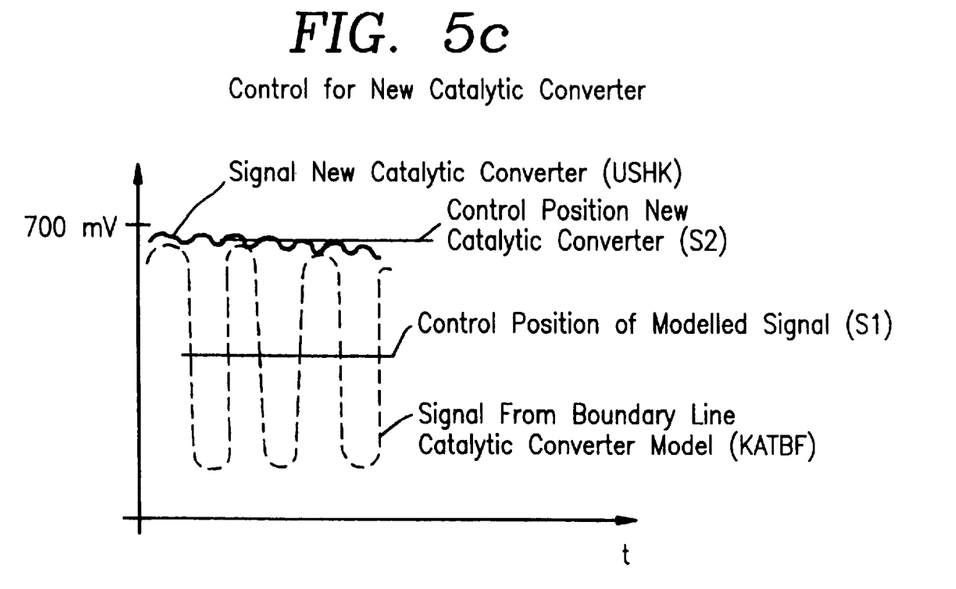

In this context, reference can be made to FIG. 5c which shows the high control position, which is characteristic for a new catalytic converter, by the solid line and the oscillation bandwidth which is facilitated thereby. The broken lines show the control position and trace of the expectation value for a hypothetical catalytic converter. The large (positive) difference between the two control positions for a new catalytic converter is apparent. The difference defines a positive offset for the signal KATIN. In the subsequent integration in block 3.4, the signal increase because of the offset can lead to the condition that the lower integrator limit is no longer reached which leads to a reduction of the oscillation bandwidth of the integrator signal and therefore to a reduction of the amplitudes of the expectation value. In the result, the limit catalytic converter expectation value is thereby brought close to the new catalytic converter actual value in an unwanted manner wherefrom, in extreme cases, the problem of erroneous detection results.

This problem is reduced via a multiplicative intervention with limiting by the blocks 3.23 and 3.24. For this purpose, the actual value S5 of the probe amplitude is limited in block 3.23.

As already mentioned, the signal S5 is small for a new catalytic converter. The signal KATIN is raised only comparatively little by the multiplicative coupling of this small signal with the difference S3. In this way, the model control position remains low and the model amplitudes remain large. From this, a large difference to the measured probe signal results. The new catalytic converter is therefore clearly identified as being good.

Figure 5D:
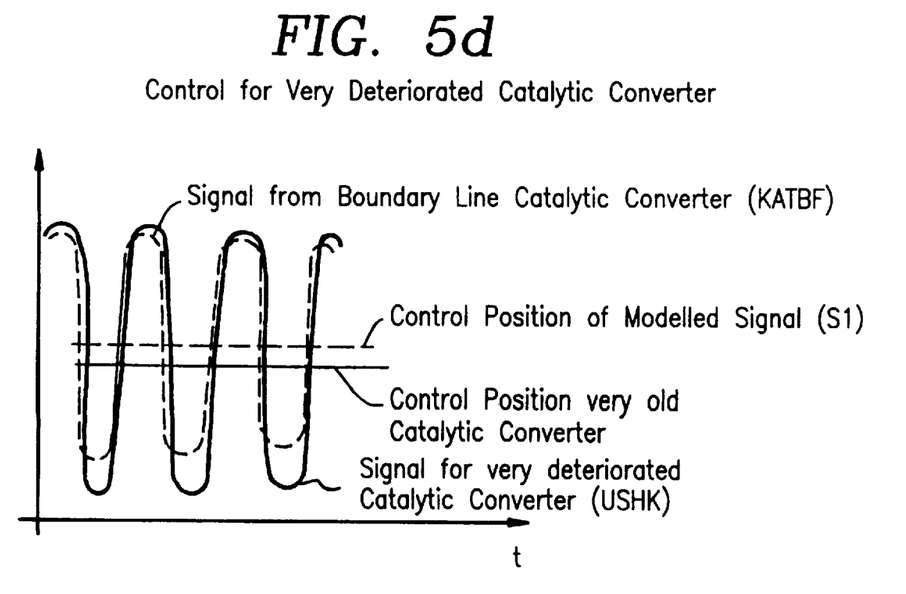

As shown in FIG. 5d, for a very deteriorated catalytic converter, the control position (solid line) of the actual value is less than the control position (broken line) of the model signal. The amplitude of the model signal is in contrast high but is still exceeded by the actual act-value fluctuations. In this case, a non-attenuated intervention of the then negative difference S3 could operate in an increasing manner on the amplitudes of the probe signal expectation value via the integrator 3.4. The model signal would then be similar to the actual signal in an unwanted manner with the result of a reduced detection reliability of the state of very deteriorated catalytic converters. In this case, the limiting in block 3.23 causes S5 not to operate to the fullest extent on the difference S3. The amplitude difference between the model limit catalytic converter and a very deteriorated catalytic converter is maintained. The very deteriorated catalytic converter is detected then as clearly poor.

It is understood that the foregoing description is that of the preferred embodiments of the invention and that various changes and modifications may be made thereto without departing from the spirit and scope of the invention as defined in the appended claims.

What is claimed is:

1. A method for evaluating the operability of a catalytic converter mounted in the exhaust-gas system of an internal combustion engine, the method comprising the steps of:

providing an exhaust-gas probe mounted downstream of said catalytic converter and said exhaust-gas probe having an operating point;

detecting the actual value of a signal of said exhaust-gas probe mounted downstream of said catalytic converter;

forming a modelled value of said signal of said exhaust-gas probe from quantities measured upstream of said catalytic converter and by considering said operating point;

forming an index for the deviation of said actual value from said modelled value; and, evaluating the operability of said catalytic converter on the basis of said index.

2. The method of claim 1, comprising the further step of determining said operating point by lowpass filtering the actual value of said signal of said exhaust-gas probe.

3. The method of claim 2, comprising the further steps of:

additionally determining the position of the operating point of the modelled signal of said exhaust-gas probe;

determining the difference of the positions of the operating point for said actual value and of the modelled probe signal;

forming a corrective quantity in dependence upon said difference;

considering said corrective quantity when modelling the probe signal of said exhaust-gas probe so that the difference between the measured probe signal and the modelled probe signal is as small as possible.

4. The method of claim 3, comprising the further step of forming said corrective quantity in dependence upon the measured amplitude of said probe signal.

5. The method of claim 4, comprising the further step of evaluating said catalytic converter as being non-operable when said index exceeds a pregiven threshold value after a pregiven time span.

6. The method of claim 5, comprising the further steps of:

providing an upstream exhaust-gas probe upstream of said catalytic converter and said upstream exhaust-gas probe outputting a first signal;

detecting the mixture quantity inducted by said engine and providing a second signal indicative of said mixture quantity; and, forming a quantity based on said first and second signals and utilizing said quantity as said quantities measured upstream of said catalytic converter.

7. The method of claim 5, comprising the further step of summing (integrating) sequentially occurring values of the difference of actual and modelled values as said measure.

8. The method of claim 7, wherein said step of summing is not executed when said catalytic converter does not operate in a compensating manner on the oxygen content in the exhaust gas.

9. The method of claim 7, wherein said step of summing is not executed when the oxygen fill level of said catalytic converter exceeds a pregiven maximum value or drops below a pregiven minimum value.

10. The method of claim 9, wherein said pregiven maximum value corresponds to the maximum oxygen storage capacity of a catalytic converter which is still just operational.

\* \* \* \* \*